United States Patent Office 2,876,544
Patented Mar. 10, 1959

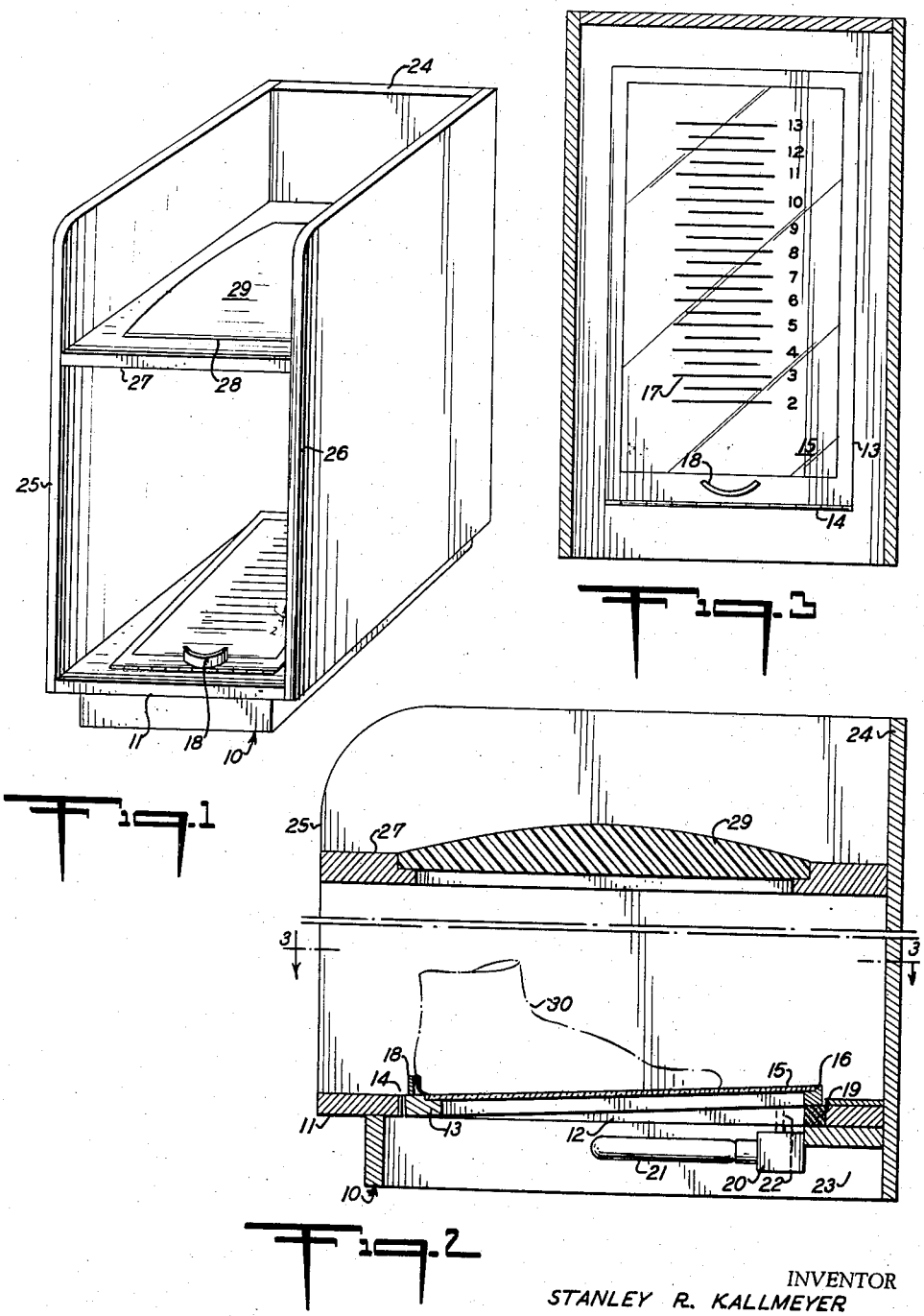

2,876,544
AUTOMATICALLY ILLUMINATED FOOT MEASURING DEVICE

Stanley R. Kallmeyer, Baltimore, Md., assignor to Cannon Shoe Company, Baltimore, Md., a corporation of Maryland Application May 3, 1957, Serial No. 656,776

1 Claim. (Cl. 33—3)

This invention relates to measuring instruments and more particularly to an automatically illuminated foot measuring device primarily intended to be utilized in shoe stores or other establishments where frequent foot measurements are desirable or necessary.

Heretofore, it has been customary for shoe salesmen to measure the feet of prospective customers by utilizing a measuring device held in the hand of the salesman or in other instances, a measuring device which rests on the floor and on which the customer places his foot with the width and length measurements being noted by the salesman. In the majority of these devices the measurement markings are of such small size that it is impossible for the customer to read the same from a sitting or standing position and consequently, he must rely on the salesman to provide the correct measurement.

Frequently a shoe customer desires to measure his own foot and for this purpose, the present invention provides a device wherein the foot measurement is clearly visible to a person standing in an upright position and in which illuminating means is provided to render the measurement markings clearly visible, regardless of the surrounding light conditions. The device may be utilized wherever convenient and merely connected to a suitable electrical outlet.

It is accordingly an object of the invention to provide an automatically illuminated foot measuring device which may be connected to an available electrical outlet and in which a person may determine the measurement of his own foot from a standing or sitting position with the measurement markings clearly visible from either position.

A further object of the invention is the provision of an automatically illuminated foot measuring device in which an electric lamp for providing illumination of the measurement markings is energized and deenergized by exerting a downward pressure with the foot and by removing the foot from the device.

A still further object of the invention is the provision of an automatically illuminated foot measuring device in which a magnifying lens is provided to magnify the size or foot measurement markings in order to render the same clearly visible to a person standing in an upright position.

A further object of the invention is the provision of an automatically illuminated foot measuring device in which both the size or foot measurement markings and the outline of the foot is clearly illuminated in order to render the same visible to the person utilizing the same.

Another object of the invention is the provision of an automatically illuminated foot measuring device including a housing to exclude exterior light thereby rendering the measurement markings and foot outline clearly visible to the user, regardless of surrounding lighting conditions.

A further object of the invention is the provision of an automatically illuminated foot measuring device which may be economically constructed from readily available materials thereby providing a convenient foot measuring device usable by a shoe customer or other person and without necessitating the attention of a salesman or attendant.

Further objects and advantages of the invention will be apparent from the following description taken in conjunction with the accompanying drawing wherein:

Fig. 1 is a view in perspective showing an automatically illuminated foot measuring device constructed in accordance with this invention;

Fig. 2 is a vertical sectional view showing the structure of the foot measuring device of this invention and particularly the means for energizing and deenergizing the lamp utilized for providing the illumination; and Fig. 3 is a sectional view taken substantially on the line 3—3 of Fig. 2 and showing the translucent sheet, together with a supporting frame therefor and the graduated size markings applied to the sheet.

With continued reference to the drawing, there is shown an automatically illuminated foot measuring device constructed in accordance with this invention and which may well comprise a hollow base 10 having a top wall 11. A generally rectangular opening 12 is provided in the top wall 11 and a generally rectangular frame 13 is pivotally mounted by a hinge 14 or other suitable means which serves to mount the frame 13 for vertical pivotal movement about a substantially horizontal axis. The hinge 14 may be secured to the frame 13 and top wall 11 at one end of the opening 12.

A sheet of translucent material 15, such as frosted glass or any other suitable material is carried by the frame 13 and may be disposed in rabbeted grooves 16 in the upper surface of the frame 13. As shown in Fig. 3, the sheet of glass or other translucent material 15 is provided with graduated size markings 17 which may be etched on the sheet 15 or applied thereto in any other suitable manner. A heel abutment 18 is secured to the frame 13 adjacent the hinge 14 and projects upwardly from the upper surface of the frame 13, for a purpose to be later described.

The end of the frame 13 opposite the hinge 14 is supported on a mass of yieldable material 19, such as sponge rubber or the like, and as best shown in Fig. 2, this mass or block of yieldable material 19 will normally serve to maintain the frame 13 and sheet 15 carried thereby in an inclined position. However, upon the application of a downward force to the sheet 14, the yieldable material 19 will be compressed to permit downward movement of the frame 13 for a purpose to be presently described. If desired, however, compression springs may be substituted for the yieldable material 19.

Mounted in the hollow base 10 is a suitable electrical receptacle 20 for receiving an electric lamp 21 and formed as a part of the receptacle 20 or separate therefrom is a switch having an actuating plunger 22 disposed in the path of movement of the frame 13. Suitable electrical connections 23 may be provided for connecting the receptacle 20 to a convenient electrical outlet and upon downward movement of the frame 13 in response to a downward force thereon, the plunger 22 will be depressed to close the switch and energize the lamp 21 and upon upward movement of the frame 13 by expansion of the yieldable mass 19, the plunger 22 will move upwardly and open the switch to deenergize the lamp 21.

A housing comprising a rear wall 24 and sidewalls 25 and 26 extends upwardly from the base 10 and it is to be noted, that the housing is open at the front as clearly shown in Fig. 1. A horizontal partition 27 is provided in the housing spaced below the upper edge thereof and generally rectangular opening 28 in the partition 27 serves to receive a magnifying lens 29 which is disposed in alignment with the opening 12 in the top wall 11 and the sheet 15 carried by the frame 13. The magnifying lens 29 may be formed of glass, plastic or any other suitable material.

In operation, when it is desired to obtain the measurement of a foot, such foot is placed within the housing and resting upon the upper surface of the sheet 15 with the heel in engagement with the heel abutment 18, as shown in dotted outline in Fig. 2. Upon exerting a downward pressure on the sheet 15, the lamp 21 will be energized to illuminate the translucent sheet 15 and the size marking 17 on the sheet 15, as well as the outline of the foot 30 will be magnified by the lens 29 and will be clearly visible to a person standing in an upright position or to a person seated and bending over a sufficient distance to look through the lens 29. Thus the length of the foot may thereby be immediately determined by the customer without the necessity of the measurement being taken by a salesman or attendant. Obviously, if desired, appropriate width markings may be provided on the sheet 15 but in the interest of clarity, such markings have been omitted.

The foot measuring device of this invention is readily portable and may be positioned at any convenient location, it only being necessary to connect the electrical supply cables 23 with the convenient electrical outlet and thereafter, the measuring device may be utilized by anyone who desires to obtain a foot measurement. Furthermore, the device of this invention may be conveniently constructed of readily available material, such as plywood or the like, thereby resulting in reducing construction costs to a minimum and furthermore, the size markings and outline of the foot are clearly visible to the person utilizing the device, regardless of surrounding lighting conditions.

It will be obvious to those skilled in the art that various changes may be made in the invention without departing from the spirit and scope thereof and therefore the invention is not limited by that which is shown in the drawings and described in the specification, but only as indicated in the appended claim.

What is claimed is:

A foot measuring device comprising a hollow base having a top wall, a generally rectangular opening in said top wall, a frame pivotally mounted in said opening for movement about a horizontal axis, a sheet of translucent material carried by said frame, graduated size markings on said sheet, a heel abutment on said frame, a mass of yieldable material disposed on said base and supporting said frame in raised position but yieldable to permit downward movement of said frame, an electric lamp disposed within said base below said sheet, a switch in said base disposed in the path of movement of said frame, whereby upon downward movement of said frame said switch will be closed to energize said lamp and upon upward movement of said frame by said yieldable material said switch will open to deenergize said lamp, a housing extending upwardly from said base having a rear wall and sidewalls and open at the front, a horizontal partition in said housing spaced below the upper edge, an opening in said partition in alignment with the opening in said top wall and a magnifying lens in the opening in said partition, whereby a person standing upright may place a foot on said sheet with the heel engaging said abutment and upon exerting a downward pressure said lamp will light to illuminate said size markings and the outline of the foot with the size markings magnified by said lens and clearly visible to the person.

References Cited in the file of this patent

UNITED STATES PATENTS

| | | |
|---|---|---|
| 2,096,615 | Macdonald | Oct. 19, 1937 |
| 2,518,798 | Legg | Aug. 15, 1950 |
| 2,650,518 | Zaroff | Sept. 1, 1953 |